Figure 1:
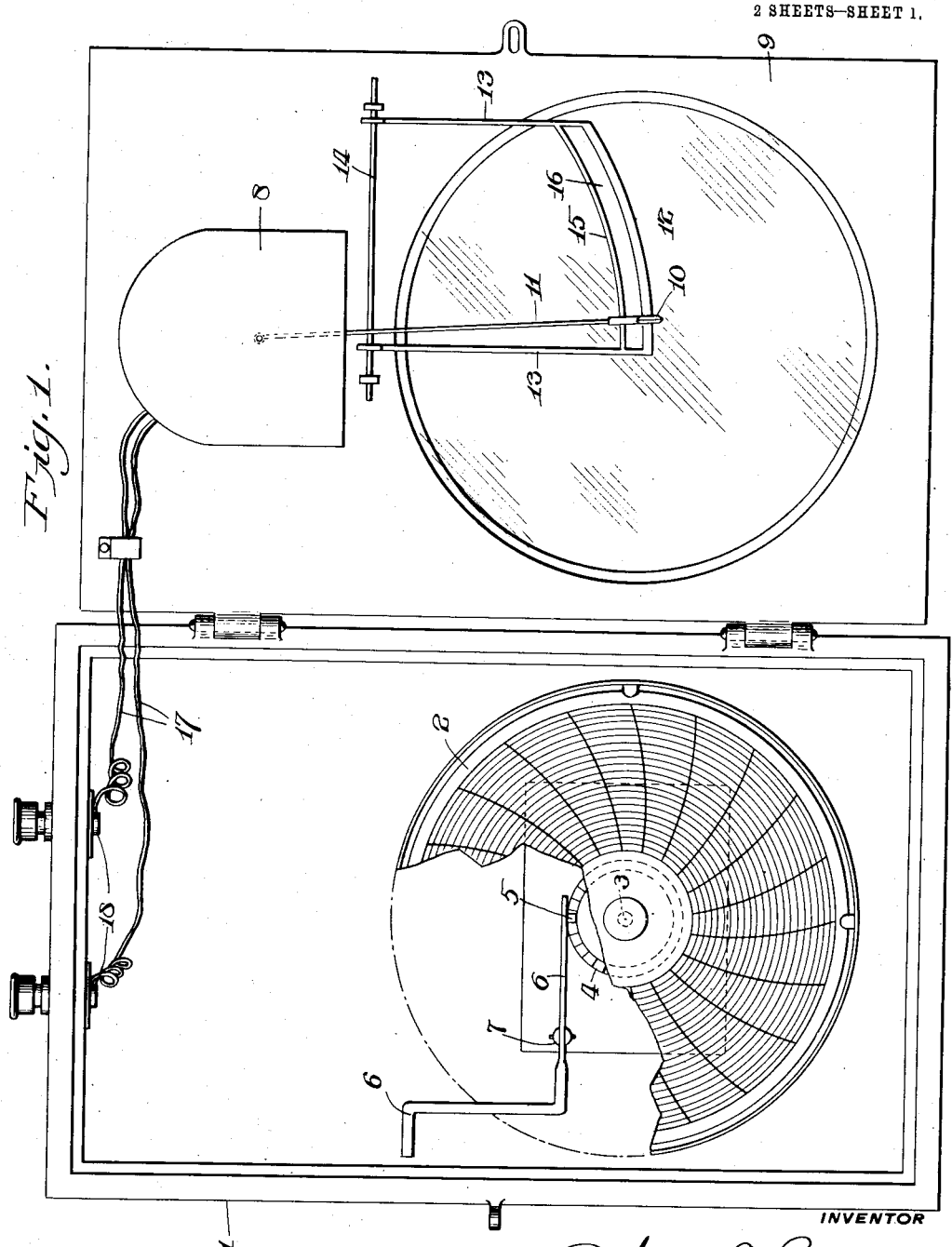

R. P. BROWN.
RECORDING INSTRUMENT.
APPLICATION FILED SEPT. 7, 1911.

1,089,744.

Patented Mar. 10, 1914.

2 SHEETS—SHEET 1.

WITNESSES

INVENTOR
Richard P. Brown
BY Chas. A. Cutter
ATTORNEY

R. P. BROWN.
RECORDING INSTRUMENT.
APPLICATION FILED SEPT. 7, 1911.
1,089,744.
Patented Mar. 10, 1914.
2 SHEETS—SHEET 2.
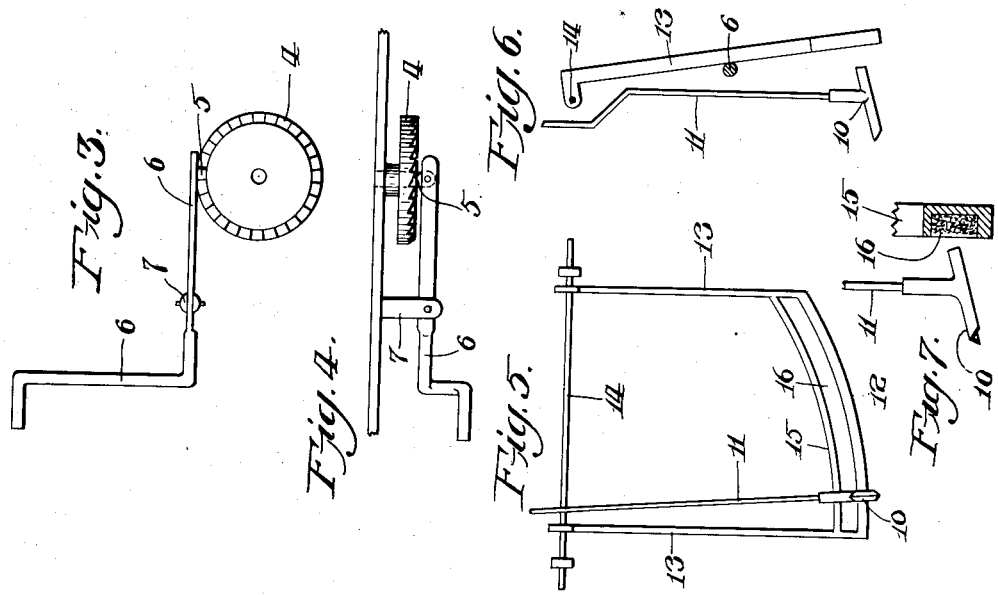
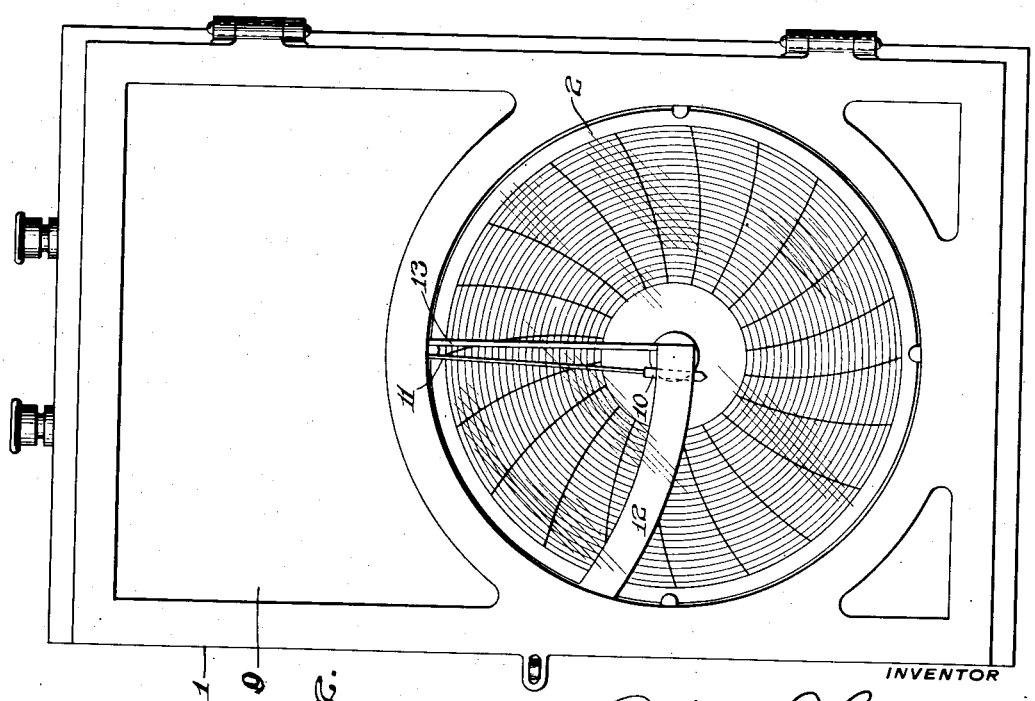

UNITED STATES PATENT OFFICE.

RICHARD PERCY BROWN, OF PHILADELPHIA, PENNSYLVANIA.

RECORDING INSTRUMENT.

1,089,744.  Specification of Letters Patent.  Patented Mar. 10, 1914.

Application filed September 7, 1911. Serial No. 648,124.

*To all whom it may concern:*

Be it known that I, RICHARD P. BROWN, a citizen of the United States, and a resident of the city and county of Philadelphia, State of Pennsylvania, have invented certain new and useful Improvements in Recording Instruments, of which the following is a specification.

My invention relates to improvements in recording instruments and more particularly to improvements in that class of instruments, electric recording pyrometers for instance, in which a record is made upon a moving chart by a stylus or pen which is actuated by some mechanism which is independent of the chart operating mechanism. The stylus or pen actuating mechanism is of a very delicate character which is easily put out of adjustment and the first part of my invention relates to a manner of carrying this whereby when the case of the instrument is opened to renew the chart or to wind the clock work which operates the chart it will be moved entirely away from the chart permitting access to this, or to the clock, without the least possibility of interfering with the stylus or its connected parts.

My invention relates secondly to an improved means for automatically supplying ink to the stylus, and thirdly, to a means, operated by the chart actuating clockwork, for causing the stylus or pen to intermittently engage the chart and the inking means.

In the accompanying drawings forming part of this specification and in which similar letters of reference indicate similar parts throughout the several views:—Figure 1, is a front elevation of my improvements as applied to an electric recording pyrometer, the front door of the instrument being swung open. Fig. 2, a front elevation of the instrument the door being closed; Fig. 3, a front elevation of part of the clockwork for rotating the chart showing lever for moving inking pad out of contact with the pin or stylus of the millivolt meter or other instrument; Fig. 4, a plan of Fig. 3; Fig. 5, a front elevation of inking pad and means for carrying the same; Fig. 6, a side elevation of Fig. 5; Fig. 7, a side elevation of stylus or pen and a cross sectional view of the inking pad upon an enlarged scale.

1 is a case which carries the usual clockwork for carrying and actuating the chart 2. The clockwork is of the usual well known form and in itself will need no detailed description.

3 is a spindle of the clockwork which carries the chart 2.

Surrounding but turning much faster than spindle 3 is a crown wheel 4 which engages a tooth 5 on a lever 6, pivoted at 7 which will be more fully described hereinafter.

8, Fig. 1, is the case which carries the mechanism the fluctuations or movements of which are to be recorded upon the chart 2. This mechanism, a millivolt meter for instance, may be of any of the usual kinds and will not need detailed description. It is however usually of very delicate construction and its adjustment may be disarranged very easily. In order that access may be had to the instrument to replace the chart or to wind the clockwork without possibility of interfering with this part I furnish the case 1 with a door 9 and secure the case 8 which carries the millivolt meter, or other instrument, to the inside of this door as shown in Fig. 1, hence when the door 9 is opened the case 8 and the parts which it carries are moved completely away from the interior of case 1 and from the chart and any operations upon the chart 2 or the clockwork which actuates it can be performed without the least necessity or danger of touching the instrument surrounded by case 8.

10 is the pen or stylus carried by an arm 11 which is actuated by the mechanism in case 8. The movements of the arm 11 are recorded upon the chart 2 by the pen or stylus 10, this movement being substantially radial with relation to the chart. The mechanism operating the arm has so very little power as a rule that it has been found necessary that the pen or stylus engage the chart intermittently else the friction between these two parts will be sufficient to prevent the movement of the pen carrying arm. It is also necessary to supply ink to the pen or stylus and I have devised a means for simultaneously accomplishing these two ends.

The instrument forming the subject of this invention is designed to be secured to a wall and I have made the pen or stylus carrying arm 11 so that it hangs from its attached mechanism in case 8 vertically, the pen or stylus 10 being normally out of contact with the chart 2, and in order to bring the pen or stylus into intermittent contact with the chart I make use of the following device which also serves to supply ink to the pen: 12 is a frame which consists of arms 13 the upper ends of which are pivotally carried, by a shaft 14 for instance and the lower ends of which are joined by a segmental piece 15 which carries an ink pad 16 the radius of which is substantially equal to the length of the stylus carrying arm 11 and which is struck from the center of the support carrying this arm. As has been before stated the arm 11 hangs vertically, and normally the point of the pen or stylus 10 is out of contact with the chart 2. The frame 12 is normally held by the outer end of the lever 6, which contacts with it when the tooth 5 carried by the lever is meshing with one of the teeth of the crown wheel 4, out of contact with the rear end of the pen or stylus but when the tooth 5 rides up on a tooth of crown wheel 4 the outer end of lever 6 is moved inward, away from the frame 12, and the lower end of this frame by gravity moves downward and inward, the inking pad 16 engaging the outer end of the pen or stylus 10 and moving the working point thereof into contact with chart 2, at the same time that the ink pad moves the stylus inward it inks it. The stylus or pen 10, which is best shown in Fig. 7, is inked at its rear end by the pad 16 the ink passing by gravity from its rear to its forward, or working end. As the crown wheel turns the tooth 5 on the lever 6 presently falls into the next tooth space and the outer end of lever 6 is moved outward engaging the frame 12 and moves the pad 16 out of contact with the pen 10 which will now hang free and out of contact with anything until the frame 12 is again released as before described.

17 are wires secured to binding posts 18 on case 1 and leading to the mechanism within case 8 carried by door 9. These wires are of sufficient length to permit the free opening or closing of door 9.

Having thus described my invention I claim as new and desire to secure by Letters Patent:

1. In a recording instrument, the combination of a case provided with a hinged door, a clockwork disposed in said case and adapted to carry a chart, an electrically operated instrument secured to said door, a stylus operated by said instrument and adapted to engage said chart when said door is closed and to swing away therefrom when the door is open, whereby charts may be removed and replaced without interference with the electrically actuated recording devices, and means actuated by said clockwork for causing an intermittent contact of said stylus with said clock, said means being disposed in part on said door and in part on said case.

2. In a recording instrument, the combination of a case provided with a hinged door, a clockwork disposed in said case and adapted to carry a chart, an electrically operated instrument secured to said door, a stylus operated by said instrument and adapted to engage said chart when said door is closed and to swing away therefrom when the door is open, whereby charts may be removed and replaced without interference with the electrically actuated recording device, and means actuated by said clockwork for causing an intermittent contact of said stylus with said clock, said means carrying an inking device and being disposed in part on said door and in part on said case.

3. In a recording instrument, the combination of a case provided with a hinged door, a clockwork disposed in said case and adapted to carry a chart, an electrically operated instrument secured to said door, a stylus operated by said instrument and adapted to engage said chart when said door is closed and to swing away therefrom when the door is open, whereby charts may be removed and replaced without interference with the electrically actuated recording devices, a swinging gravity frame hinged to said door and adapted to drive said stylus into contact with said chart when the door is closed, and means operated intermittently by said clockwork and adapted when said door is closed to engage said frame for holding it normally out of contact with said stylus and periodically releasing it to perform its recording function.

4. In a recording instrument, the combination of a case provided with a hinged door, a clockwork disposed in said case and adapted to carry a chart, an electrically operated instrument secured to said door, a stylus operated by said instrument and adapted to engage said chart when said door is closed and to swing away therefrom when the door is open, whereby charts may be removed and replaced without interference with the electrically actuated recording devices, a movable frame secured to said door, carrying an inking device and adapted to engage said stylus, and means operated intermittently by said clockwork and adapted when said door is closed to engage said frame for holding it normally out of contact with said stylus and periodically releasing it to perform its recording function.

5. In a recording instrument, the combination of a case provided with a hinged door, a clockwork disposed in said case and adapted to carry a chart, an electrically operated instrument secured to said door, a stylus operated by said instrument and adapted to engage said chart when said door is closed and to swing away therefrom when the door is open, whereby charts may be removed and replaced without interference with the electrically actuated recording devices, a movable frame secured to said door, carrying an inking device and adapted to engage said stylus, and means operated intermittently by said clockwork and adapted when said door is closed to engage said frame for holding it normally out of contact with said stylus and periodically releasing it to perform its recording function, said means comprising a lever pivoted within said casing and provided at one end with an arm adapted to engage said movable frame when said door is closed and a ratchet crown wheel turned by said clockwork and engaging the other end of said lever.

6. In an instrument of the character described, in combination, an arm carrying a stylus or pen and an ink pad adapted to intermittently engage the rear side of said stylus or pen.

7. In an instrument of the character described, in combination, an arm carrying a stylus or pen, a swinging arm, an ink pad carried by said arm, and means for moving said swinging arm and pad into and out of contact with said stylus or pen.

RICHARD PERCY BROWN.

Witnesses:
CHARLES HEIMAN,
CHARLES A. RUTTER.